Patented May 2, 1939

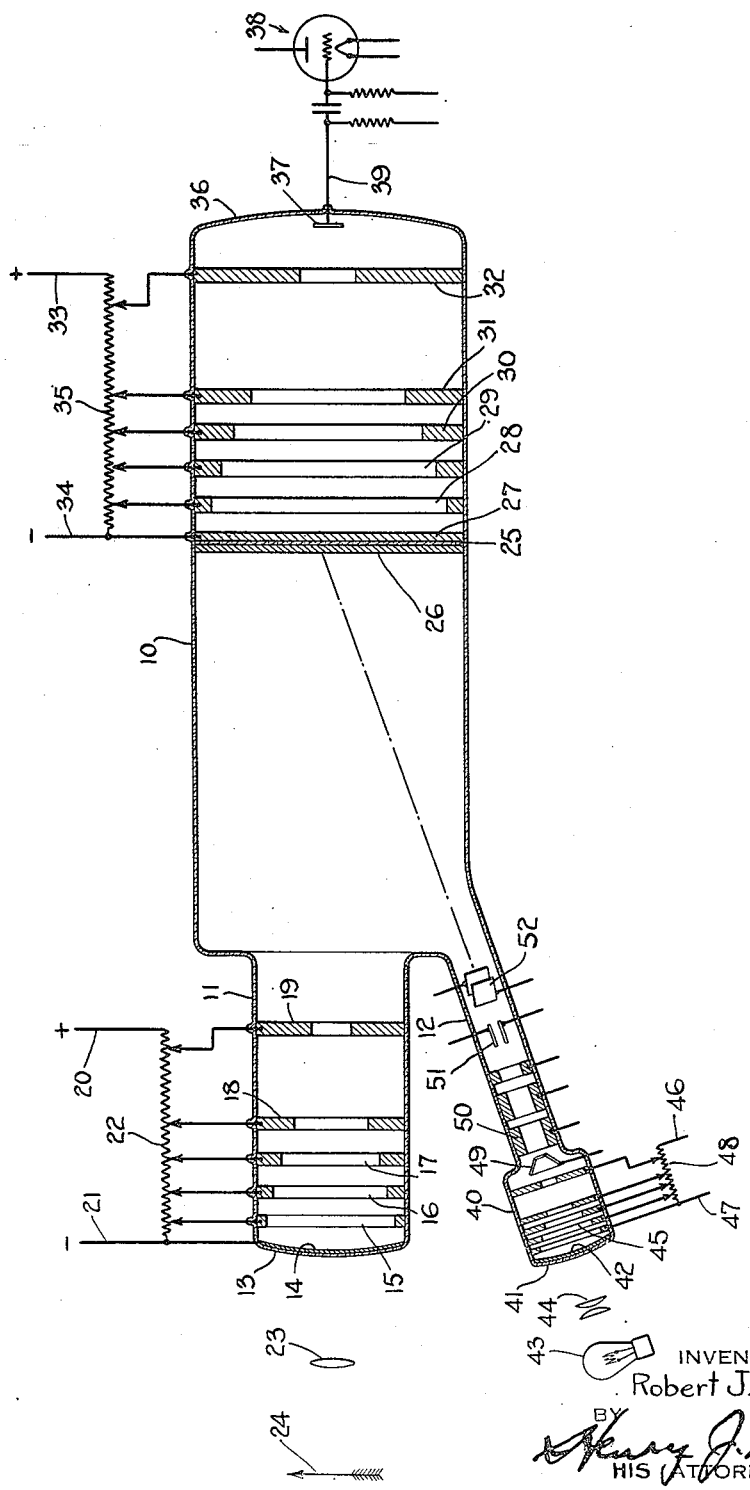

2,156,813

UNITED STATES PATENT OFFICE 2,156,813

ELECTRONIC CAMERA

Robert J. Kautz, Brooklyn, N. Y.

Application August 26, 1936, Serial No. 97,920

4 Claims. (Cl. 178—7.2)

My present invention relates to cathode ray tubes, and more particularly to an improved electronic camera, dissector, and collector embodying an improved cathode ray tube camera and a cold cathode ray projector.

In carrying out my invention I employ the principle of a cathode ray tube, and associate therewith annular electrostatic lenses for focusing electrons emitted from a photo-electric element excited by light or heat waves, which are focused thereon by a lens interposed between the photo-electric element and the object to be viewed, it being understood that the photo-electric element is in the focal plane of the lens. The electron stream from the photo-electric element after passing through the electro-static condensing lenses are projected onto a willemite screen which is deposited on a transparent dielectric such as mica, the willemite screen being in the focal plane of the electrostatic lens above referred to. There is thus created a luminous image on the willemite screen of the object being viewed. On the opposite side of the transparent dielectric carrying the willemite screen is deposited a photo-electric element which has emanating therefrom, because of the excitation thereof created by the image on the willemite screen, a stream of electrons which are condensed and focused by a plurality of annular electrostatic lenses onto a collecting plate which is in circuit with an amplifying device or circuit.

In order to increase the value of the results produced by the light emitted from the luminous image on the willemite screen, I have associated with the same a cold cathode ray projector which has a photo-electric element excited by a constant source of light, and the electrons emanating therefrom, are focused onto a grid element and then passed through electrostatic elements and condensed into a single beam which is controlled in a vertical and horizontal direction by proper instrumentalities, and the beam of electrons is passed successively over the face of the willemite screen above referred to, thus intensifying and amplifying successively at a plurality of points the luminous image on the willemite screen, the value of the intensifying and amplifying acting varying in accordance with the lights and shades of the image.

The apparatus employed is contained in an evacuated tube or chamber, or a chamber filled with an inert gas, and is of especial value in viewing distant objects regardless of atmospheric conditions, and scanning such object and projecting to any distance by the ordinary well known means such image to a distant point where it may be translated and projected as a visible image onto any suitable screen.

A feature of my invention is an improved electronic camera and ray projector.

Another feature of my invention is a cold cathode ray projector.

Other features of my invention will be apparent as the description of the invention progresses.

In the accompanying drawing illustrating one form of my invention, 10 designates a tubular member of vitreous material such as glass, having at one end thereof a reduced extension 11 lying in the axis of the member 10. I attach at one end of the member 10, adjacent to the extension 11, a cold cathode ray tube designated by the reference character 12. The members 10, 11 and 12 are preferably cylindrical in form and form a unitary structure which is hollow and which may be evacuated to any desired degree and either remain in such condition or be filled with an inert gas.

The end of the tubular member 11 is closed at 13 and the inner surface of such closed end 13 is provided with a photo-electric element 14. Within the tubular member 11 are arranged a plurality of annular electrostatic lenses 15, 16, 17, 18 and 19, and such electrostatic lenses are connected to a source of power designated by the conductors 20 and 21, and to a resistance 22 connected in such circuit, and by means of which the values of the electrostatic lenses may be varied for the purpose of focusing the stream of electrons emitted from the photo-electric element 14.

Lying in the focal plane of the photo-electric element 14 and in the axis of but outside the tubular member 11, is a lens 23, which in turn may be focused upon an object indicated by the arrow 24.

Within the tubular member 10 and intermediate the ends thereof is arranged a transparent dielectric diaphragm 25 of mica or other transparent material on the face of which, toward the electrostatic lenses above referred to, is formed a willemite screen 26, the screen being in the focal plane of the electrostatic lenses.

On the opposite face of the diaphragm 25 is formed a photo-electric element 27, and between such photo-electric element and the other end of the tubular member 10 is arranged a plurality of electrostatic lenses 28, 29, 30, 31 and 32, such electrostatic lenses being connected to a source of power as indicated by the conductors 33 and 34, a resistance 35 being included in such circuit. Also it will be noted that the photo-electric element 27 is included in such circuit. The end of the tubular member 10 is closed as indicated by the reference numeral 36 and adjacent thereto and in the focus of the electrostatic lenses 27 to 32 inclusive is arranged a collector plate 37 and on which impinges the electron stream focused by the electrostatic lenses 27 to 32 inclusive. The collector plate 37 is connected by a conductor 39 to an amplifying device designated generally by the reference numeral 38.

Assuming the structure as thus far described to be in proper position and the lens 23 focused on the object 24 to be examined, the light passing through the lens 23 is projected onto the photo-electric element 14, whereupon electrons are emitted from such photo-electric element and the electrons are focused and condensed by the electrostatic lenses 15 to 19 inclusive, and are projected onto the willemite screen 26. There is therefore produced an image on the willemite screen of the object 24 being viewed and such image may or may not be luminous. The image on the willemite screen 26 excites the photo-electric element 27 on the opposite face of the transparent diaphragm 25 and electrons are emitted from such photoelectric element and are focused and condensed by the electrostatic lenses 28 to 32 inclusive, impinging onto the collector plate 37 and affecting variably and in accordance with the light and shades of the image the amplifying circuit of the device 38.

As the rate of excitation of the photo-electric element 27 is relatively slow because of the practically constant illumination of the entire surface of the willemite screen 26, I find it advantageous to employ a cathode ray projector, and such projector is contained in the cold cathode ray tube 12 above referred to. By means of the cold cathode ray tube 12 I am enabled to progressively scan the entire surface of the image on the willemite tube 26 to increase or intensify progressively the various portions of such image, with the effect that the rate of emission of electrons from the photo-electric element 27 is greatly accelerated.

At the end of the tube 12 remote from the tubular member 10 is an enlargement 40 having a closed end 41 and the inner surface of such closed end has formed thereon a photo-electric element 42 which receives light for exciting purposes from a source of light 43 and which passes through the lenses 44. Within the enlargement 40 is arranged a plurality of electrostatic lenses designated collectively by the reference numeral 45, connected to a source of power designated by the conductors 46 and 47, and which has in circuit therewith a resistance 48.

The rays of light impinging on the photo-electric element 42 causes the emission of electrons which are focused and condensed by the electrostatic lenses 45 and are brought to a focus on the grid 49 from which they pass as a single concentrated beam through a plurality of electrostatic elements 50, where they are controlled for vertical and horizontal deflection by the plates 51 and 52 respectively, the ray or bundle of rays then impinging on the luminous image on the willemite screen 26.

The vertical and horizontal deflecting plates 51 and 52 respectively cause the ray or beam of electrons emitted from the photo-electric element 42 to successively pass over every portion of the image on the willemite screen 26, with the result that there is produced in the electrons emitted from the photo-electric element 27 an increased flow which will vary in accordance with the lights and shades of the image on the willemite screen, thus causing a variation in the intensity of the illumination of the collector plate 37, with the consequent variation in the intensity of the circuit passing through the conductor 39 to the amplifying device 38.

The electrostatic lenses 15 through 19, inclusive, and 27 to 32, inclusive, may have their electrical value varied by means of the connection to the resistances 22 and 35 respectively, as is well known in this art. Also the electrical value of the electrostatic lenses designated generally by the numeral 45 may have their values varied by means of the connection to the resistance 48. It is to be understood, of course, that the electrical values of the electrostatic lenses above referred to may be individually varied by any suitable means, or the groups of electrostatic lenses may be varied as groups.

While my invention has been described in connection with one specific embodiment thereof, it is obvious that my invention may be incorporated in a number of embodiments and I am, therefore, not to be limited to the exact construction as shown and described.

I claim:

1. In an electronic camera the combination of photo-electric elements spaced apart from each other, a collecting plate, a willemite screen, said photo-electric elements, said willemite screen and said collecting plate having a common axis, means for affecting one of said photo-electric elements, electrostatic lenses associated with said photo-electric element for focusing the electrons emitted from the said one photo-electric element and directing said electrons unto the other said photo-electric element, and electrostatic lenses associated with said other photo-electric elements for focusing said electrons unto said willemite screen.

2. An improved electronic camera comprising an elongated substantially cylindrical evacuated tube of vitreous material, a photo-electric element mounted on the inner-surface of one end thereof, a collecting plate mounted adjacent to the inner-surface of the other end of said tube, a photo-electric element mounted within the tube and arranged in the focal plane of the first said photo-electric element, a lens located without the tube and in the focal plane of the first said photo-electric element, said lens being used for viewing a distant object, a willemite screen associated with the photo-electric element and located between the first said photoelectric element and the collecting plate, electrostatic lenses associated with each of the photo-electric elements for collecting electrons emitted from such photo-electric elements and focusing the same on the willemite screen and collecting plate respectively, an amplifying device including in-put circuit connected to the collecting plate, and a cathode ray projector associated with said tube and provided with means for scanning the image projecting onto the willemite screen, whereby an increase in the excitation of the normal effect of the image projected on such second photo-electric element from the first said photo-electric element, such excitation being variable in accordance with the lights and shades of the image projected on the willemite screen.

3. An improved electronic camera comprising, an elongated cylindrical evacuated or inert gas filled tube of vitreous material, a photo-electric element mounted on the inner surface and at one end thereof, a willemite screen positioned in said tube and located in the focal plane of the photo-electric element, an electro-static lens associated with the photo-electric element for collecting electrons emitted from the photo-electric element and focusing the same on the willemite screen, a transparent diaphragm positioned within the tube at the edge of the focal plane of the photo-electric element and serving as a mounting for the willemite screen, a photo-electric element mounted on the opposite side of the transparent diaphragm from the willemite screen, a collecting plate in said tube, an amplifying device connected to said collecting plate and having an input circuit, an electrostatic lens associated with said last named photo-electric element for collecting the electrons emitted therefrom and focusing the same on the collecting plate, said collecting plate being positioned at the focal point of said electrostatic lens, and a cathode ray projector associated with said tube and provided with means for scanning the image projected on to the willemite screen, whereby an increase in the excitation of the normal effect of the image projected on the said willemite screen from the first said photo-electric element, such excitation being variable in accordance with the lights and shades of the image projected thereby causing corresponding emissions from the second photo-electric element, said emissions being collected and focused by the second said electro-static lens and projected onto the collecting plate.

4. An improved electronic camera comprising an elongated substantially cylindrical inert gas-filled tube of vitreous material, a photo-electric element mounted on the inner-surface of one end thereof, a collecting plate mounted adjacent to the inner-surface of the other end of said tube, a photo-electric element mounted within the tube and arranged in the focal plane of the first said photo-electric element, a lens located without the tube and in the focal plane of the first said photo-electric element, said lens being used for viewing a distant object, a willemite screen associated with the photo-electric element and located between the first said photo-electric element and the collecting plate, electrostatic lenses associated with each of the photo-electric elements for collecting electrons emitted from such photo-electric elements and focusing the same on the willemite screen and collecting plate respectively, an amplifying device including in-put circuit connected to the collecting plate, and a cathode ray projector associated with said tube and provided with means for scanning the image projecting onto the willemite screen, whereby an increase in the excitation of the normal effect of the image projected on such second photo-electric element from the first said photo-electric element, such excitation being variable in accordance with the lights and shades of the image projected on the willemite screen.

ROBERT J. KAUTZ.